United States Patent
McMillan et al.

[11] Patent Number: 5,256,342
[45] Date of Patent: * Oct. 26, 1993

[54] METHOD OF LINING A HOST PIPE WITH A LINER USING CRYOGENIC COOLING

[75] Inventors: Jim S. McMillan, Benbrook; Simon Tarsha, Fort Worth, both of Tex.

[73] Assignee: Pipe Rehab International, Inc., Memphis, Tenn.

[*] Notice: The portion of the term of this patent subsequent to May 19, 2009 has been disclaimed.

[21] Appl. No.: 884,698

[22] Filed: May 18, 1992

Related U.S. Application Data

[63] Continuation of Ser. No. 672,831, Mar. 21, 1991, Pat. No. 5,114,634.

[51] Int. Cl.$^5$ .................. B29C 35/16; B29C 43/46
[52] U.S. Cl. ......................... 264/28; 29/447; 156/294; 264/36; 264/237; 264/269; 264/320; 264/348; 264/229; 425/335
[58] Field of Search ............ 264/28, 36, 237, 516, 264/249, 294, 269, 348, 35, 284, 293, 285, 295, 320, 229; 156/287, 294; 29/447; 138/97, 138; 425/324.1, 363, 335

[56] References Cited

U.S. PATENT DOCUMENTS

| | | | |
|---|---|---|---|
| 3,429,954 | 2/1969 | Atkins et al. | 156/294 |
| 3,959,424 | 5/1976 | Dawson et al. | 264/269 |
| 4,207,130 | 6/1980 | Barber | 264/173 |
| 4,377,335 | 3/1983 | Fannon et al. | 29/447 |
| 4,391,028 | 7/1983 | Choudhury et al. | 264/28 |
| 4,573,248 | 3/1986 | Hackett | 29/447 |
| 4,956,042 | 9/1990 | Hubert et al. | 264/28 |
| 5,114,634 | 5/1992 | McMillan et al. | 264/28 |

Primary Examiner—Jeffery Thurlow
Assistant Examiner—Mathieu Vargot
Attorney, Agent, or Firm—Charles D. Gunter, Jr.

[57] ABSTRACT

A method and apparatus are shown for lining a host pipe with an elastomeric liner having an outside diameter which is initially greater than the inside diameter of the host pipe. A length of the liner is reduced to a downsized outside diameter and the downsized liner is cryogenically cooled to a supercooled state to maintain the downsized dimensions of the liner while increasing the tensile strength to facilitate insertion of the liner into the host pipe.

2 Claims, 2 Drawing Sheets

METHOD OF LINING A HOST PIPE WITH A LINER USING CRYOGENIC COOLING

This is a continuation of application Ser. No. 07/672,831, filed Mar. 21, 1991, now U.S. Pat. No. 5,114,634.

BACKGROUND OF THE INVENTION

1. Field of the Invention

The present invention relates generally to a method and apparatus for lining a host pipe, such as a steel pipe, with a synthetic liner, the liner being cooled to a very low temperature prior to insertion within in the host pipe to facilitate the insertion operation.

2. Description of the Prior Art

Fluid-carrying pipes are often subject to corrosion and other conditions which are detrimental to the life of the pipe, or to the fluids moving through the pipe. Plastic inserts have been used in the past for protective purposes but generally involve cumbersome and difficult procedures for effectively installing such liners, and particularly in sealing them to the wall of pipe.

U.S. Pat. No. 3,494,813, to Lawrence et al, Feb. 10, 1970, shows a method for installing a plastic liner in a pipe by using vacuum to draw the liner into the pipe and to assure tight sealing engagement between the liner and the pipe wall.

U.S. Pat. No. 1,708,141, to Kepler, Apr. 9, 1929, shows a method of lining a pipe with an elastomeric lining in which the lining is pushed through a reducing die and coated with cement.

U.S. Pat. No. 3,462,825, to Pope et al, Aug. 26, 1969, shows a method for lining a host pipe with a fluorocarbon liner. The liner is placed in the host pipe by gripping one end of the liner and pulling it through a reducing die and into the host pipe. The liner is then released, allowing it to expand into engagement with the inner wall of the host pipe.

Although certain of the above methods have attempted to install synthetic liners within tubular conduit without the use of heat, adhesives or vacuum, these methods have generally suffered from various deficiencies. One problem encountered in installing a downsized liner within a host pipe was maintaining the downsized liner at the downsized dimensions during the installation procedure since the downsized liner tended to reversely expand with time. Also, where a length of liner was pulled by a leading end during the installation, the liner tended to elongate and become thinner in sidewall cross-section at the leading end. The decrease in tensile strength which resulted, limited the distance the liner could be pulled without undue elongation and wall thinning distortion or severing.

An object of the present invention is to provide an improved synthetic liner for a host pipe in which the liner is firmly held in position within the host pipe by reason of radial pressure exerted on the host pipe by the synthetic liner.

Another object of the invention is to provide a method for installing a liner within a host pipe which places the liner in a condition of circumferential compression to thereby secure the liner within the surrounding host pipe.

Another object of the invention is the provision of a liner for a host pipe which is installed without the necessity of heating the liner with the risk of imparting thermal stresses to the liner.

Another object of the invention is to provide a method for lining a host pipe without the use of chemical bonding agents which, on occasion, fail to provide uniform bonding of the liner to the surrounding host pipe.

Another object of the invention is to provide an improved method for installing a liner within a host pipe in which the liner is cryogenically cooled to a supercooled state to facilitate insertion of the liner within the host pipe.

Another object of the invention is to provide a method for installing a liner by pulling the liner within a host pipe in which the tensile strength of the liner is increased by the method to allow the liner to be pulled over greater lengths.

SUMMARY OF THE INVENTION

The method of the invention is used to line a host pipe with an elastomeric liner having an outside diameter which is initially greater than the inside diameter of the host pipe. Preferably, a length of the liner is first reduced to a downsized outside diameter by fixed die reduction, roller die reduction or crushing at a downsizing station. The liner is then passed through a cooling station including a cooling chamber into which supercooled media such as supercooled gases or supercooled liquids or liquid baths are utilized to thereby cryogenically cool the liner to a supercooled state, the step of supercooling the liner being effective to maintain the outside diameter of the liner in the downsized state and allow the liner to be inserted within the inside diameter of the host pipe. The liner is then inserted into the host pipe to be lined and allowed to expand at atmospheric conditions to substantially its original outside diameter to thereby secure the liner within the host pipe.

Additional objects, features, and advantages will be apparent in the written description which follows.

DETAILED DESCRIPTION OF THE INVENTION

Figure 1:
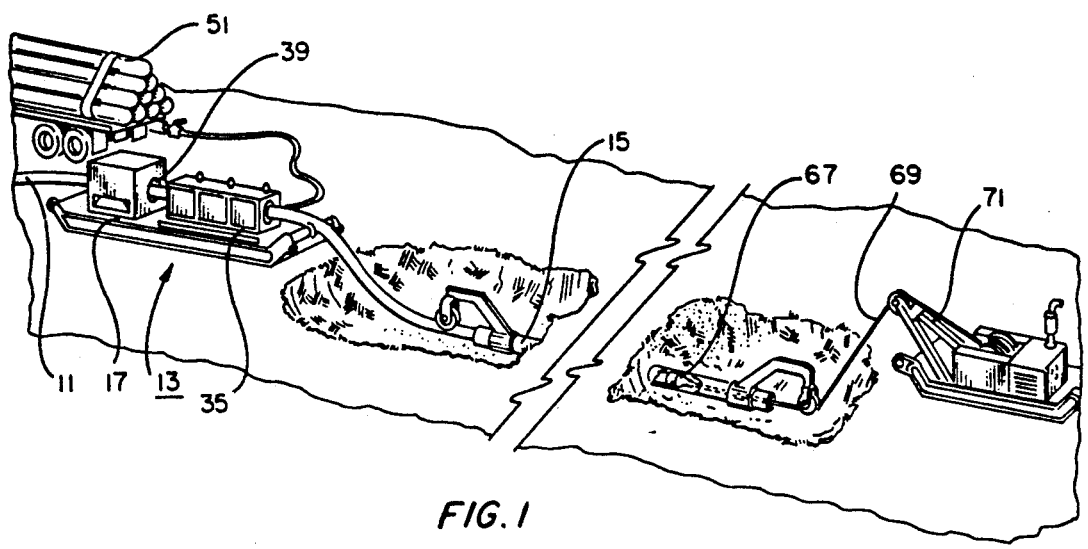
FIG. 1 is a partial perspective view of a supercooled liner of the invention being pulled into a host pipe by a pulling unit.

FIG. 1 is a simplified view of the steps and apparatus used in the method of the invention. A length of elastomeric liner 11 is fed from a supply source through the apparatus, designated generally as 13, to a host pipe 15 to be lined. The host pipe 15 can be, for instance, a cylindrical conduit, such as a steel pipe. It will be apparent that the host pipe 15 could, as well, be a water main, gas main, sewer line, chemical process line, or the like.

The elastomeric liner 11 can be any synthetic elastomer which initially has an outside diameter greater than the inside diameter of the host pipe 15 and which can be downsized and returned to substantially its original outside diameter according to the method of the invention. Preferred liner materials include polyolefin materials, with the preferred material being commercially available polyethylene pipe. An increase in the initial outside diameter of the liner increases the force necessary to downsize the liner. As a result, a liner having only slightly greater outside diameter than the host pipe 15 to be lined is preferred.

Figure 2:
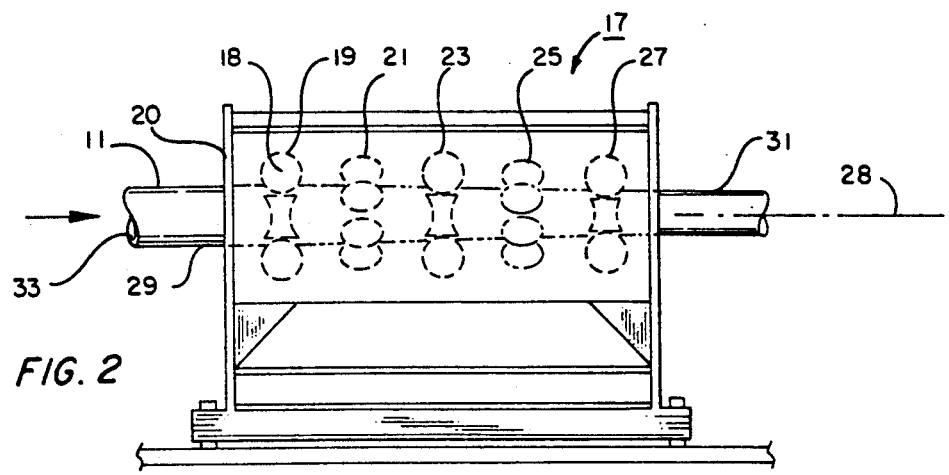
FIG. 2 is an isolated view of a set of downsizing rollers of the type used to reduce the outside diameter of the liner in the first step of the method of the invention.
Figure 3:
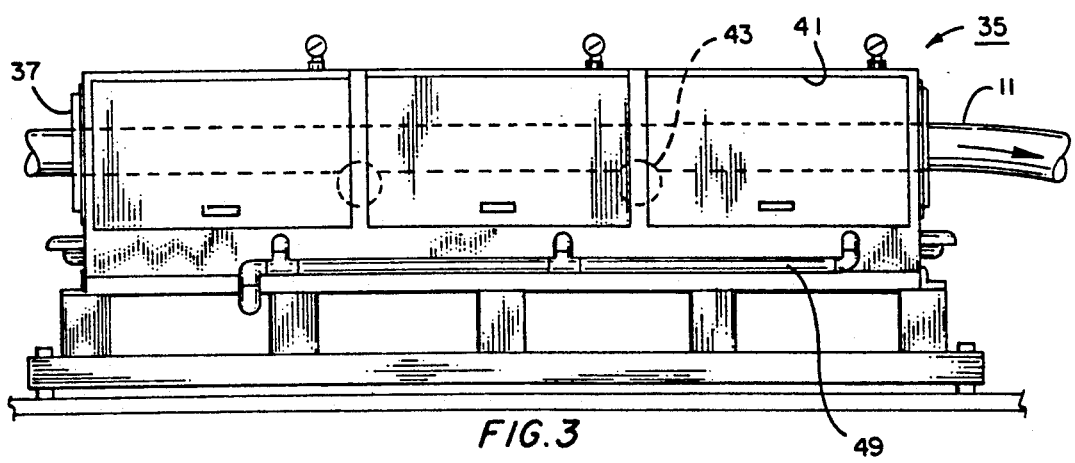
FIG. 3 is a simplified, side view of the cooling chamber used in the method of the invention showing a liner passing through the chamber.

Turning again to FIG. 1, the liner 11 is first passed through one or more sets of downsizing rollers at a rolling station 17. FIG. 2 shows an isolated view of the rolling station 17 with five sets of downsizing rollers 19, 21, 23, 25, 27. Each set of downsizing rollers 19 includes a plurality of hemispherical rollers, in this case four hemispherical rollers, each of which is rotatable about a shaft (e.g. shaft 18) mounted on the frame 20 of the rolling station. Each of the four rollers in a given set 19 has a central axis of rotation which forms a 90° angle with the next adjacent roller and which intersects at the midpoint of a liner receiving opening 29 when the liner is passed through the rolling station. In this way, the rollers define a 360° region of contact with the liner being fed through the liner receiving opening 29. FIG. 2 shows a leading end 31 and a trailing end 33 of the liner 11 being fed through the rolling station 17.

Since a smaller diameter roller produces a greater shock on the liner being downsized, each of the rollers in a set 19 has a diameter (taken along the central axis of rotation) at least about $1\frac{1}{2}$ times the outside diameter of the liner 11. Preferably, the roller diameter is at least about twice the original outside diameter of the liner.

As seen in FIG. 1, each of the additional roller sets 21, 23, 25, 27 are mounted in the rolling station 17 along a longitudinal axis 28 defined by the midpoint of the liner receiving opening 29. Each of the roller sets is identical in construction and arrangement to that of the first set 19. However, each of the roller sets is machined to provide a progressively smaller liner receiving opening. For instance, in the embodiment shown in FIG. 2, the first roller set 19 provides a 4% reduction in the original outside diameter of the liner 11 with the roller set 21 providing a 6% reduction, the roller set 23 providing a 8% reduction, the roller set 25 providing an 10% reduction and the roller set 27 providing a 12% reduction in the original outside diameter of the liner 11.

The downsized liner leading end 31 is next passed to a cooling station 35 having a liner receiving opening 37 which is aligned with the exit opening 39 (FIG. 1) of the rolling station 17. The cooling station includes a cooling chamber 41 into which supercooled gases are injected to thereby cryogenically cool the liner 11 to a supercooled state. Liquified gases can be maintained at very low temperatures, i.e., in the range from $-20°$ to $-320°$ F. Thus it is possible to compress a gas to the liquid phase and further cool it by boiling under reduced pressure. This method has been used, for instance, to liquefy nitrogen. A gas may also be cooled by making it do work in the course of an expansion. For purposes of the present invention, a supercooled inert gas is selected which is effective to cool the liner 11 in the range from about $-20°$ to $-150°$ F. Although a number of inert liquified gases and mixtures of gases are available, liquid nitrogen is preferred due to its availability.

The cryogenic cooling of materials will not be further described since a number of references are available including McClintock, M. *Cryogenics*, Van Nostrand Reinhold, New York, 1964; Vance, R.W. *Cryogenic Technology*, Wiley, New York, 1963; and Barron, R. *Cryogenic Systems*, McGraw Hill, New York, 1966. Liquid nitrogen, in bottle form (51 in FIG. 1) is commercially available from a number of sources.

Figure 4:
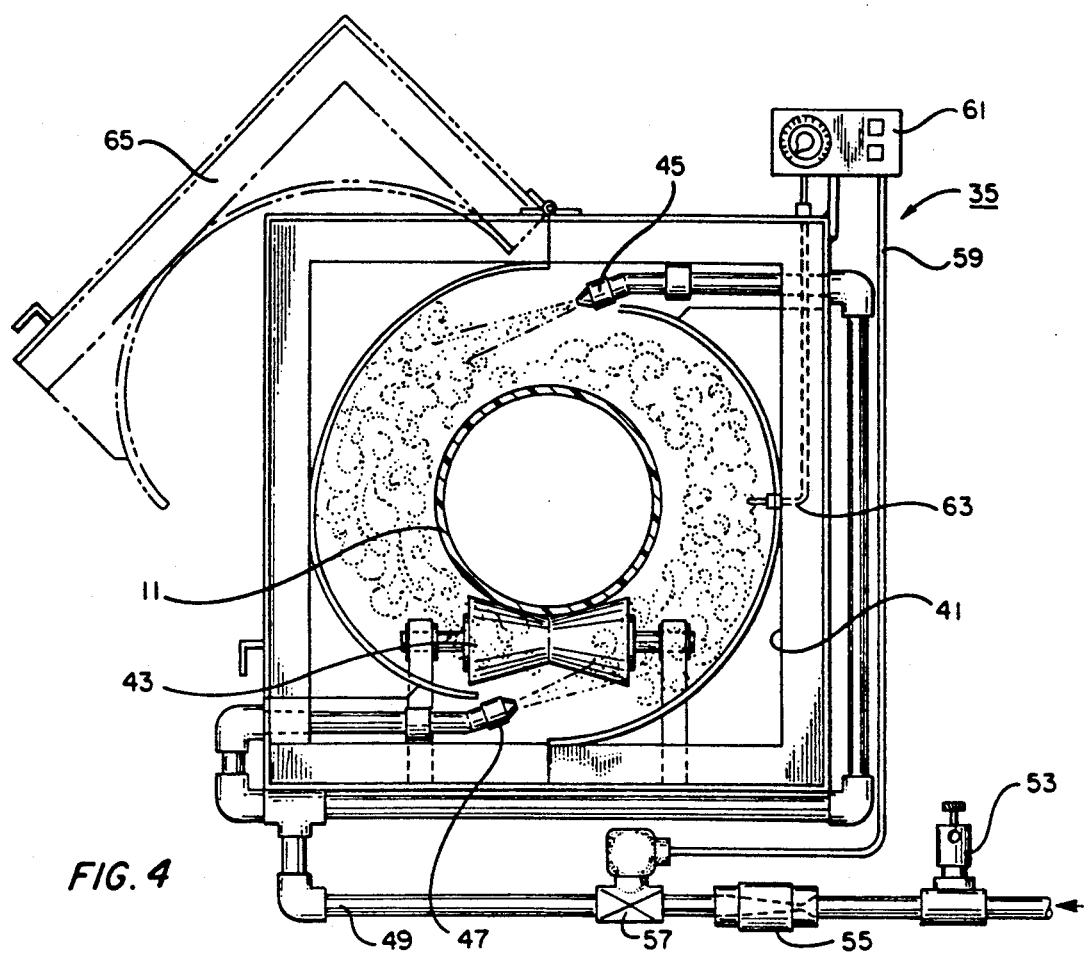
FIG. 4 is an end view of the cooling chamber of FIG. 3, showing the supercooled gases being injected into the chamber.

FIG. 4 is an end view of the cooling station 35 showing the liner 11 passing therethrough on a series of idler rollers 43. The chamber 41 includes one or more nozzles 45, 47 which are connected by means of a supply conduit 49 with the liquified gas supply (51 in FIG. 1). In the embodiment shown, the supply conduit 49 is provided with a relief valve 53, an interchangeable orifice 55 which acts as a flow meter and a thermostatic regulator valve 57, all of which are commercially available. The thermostatic regulator valve 57 has a pilot line 59 passing to a thermostat 61 which, in turn, controls the flow of supercooled gas to the chamber 41. A probe 63 located within the chamber interior is used to sense the internal temperature allowing the thermostat 61 to maintain the temperature in the range from about $-20°$ to $-100°$, preferably about $-20°$ to $-60°$ F.

In the example shown in FIG. 4, the nozzles 45, 47 are located 180° apart about the circumference of the liner 11, and are pointed upstream. That is, the nozzles are pointed in the direction of the trailing end of the liner 11, in order to provide better coverage of the outside surface of the liner. It will be appreciated that a greater or lesser number of nozzles can be utilized as well. Also, more than one set of nozzles 45, 47 will typically be provided within the interior 41 of the cooling station 35 spaced at regular intervals along the path of travel of the liner 11. The cooling station 35 can also be provided with hinged doors 65 which provide access to the cooling chamber interior 41.

Figure 5:
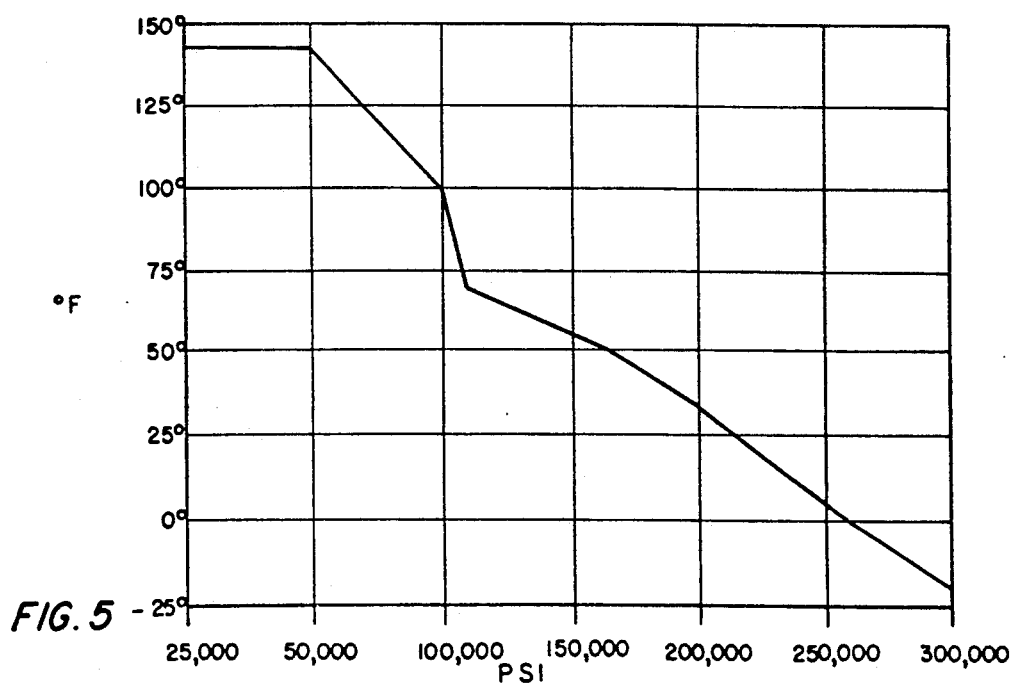
FIG. 5 is a graph of instantaneous modulus of elasticity versus temperature for polyethylene, showing the increase in tensile strength obtained by lowering the temperature of the material.

The step of supercooling the liner is effective to maintain the outside diameter of the liner in the downsized state and allow the liner to be inserted within the inside diameter of the host pipe 15 with little if any frictional resistance. FIG. 5 is a graph of instantaneous modulus of elasticity on the horizontal scale versus temperature on the vertical scale for the polyethylene liner 11. As can be seen, supercooling of the liner 11 causes a tremendous increase in the tensile strength of the material, thereby allowing the liner 11 to be pulled over greater distances without unduly distorting or severing due to elongation.

In the installation illustrated in FIG. 1, the supercooled liner is installed within the host pipe 15 by attaching a nose cone 67 to the leading end 31 of the liner and by attaching a cable 69 to a pulling unit such as winch 71. After the liner has been inserted into the host pipe 15 by the pulling unit 71, it is allowed to expand at atmospheric conditions to substantially its original outside diameter to thereby secure the liner within the host pipe.

An invention has been provided with several advantages. By supercooling the liner the tensile strength is increased, thereby allowing the liner to be pulled over greater distances and decreasing the amount of distortion experienced by the liner. The act of cooling the liner itself decreases the outside diameter thereof, allowing the liner to be inserted within a host pipe without further downsizing, in some situations. In those cases where a downsizing unit is also present, the supercooling step further decreases the outside diameter of the liner, thereby decreasing the frictional resistance incurred in pulling the liner within the surrounding host pipe. The supercooling step in the method of the invention is well adapted for use with a number of liner forming systems presently available in the marketplace. By supercooling the liner after a downsizing step, the reverse expansion period is prolonged, thereby allowing a longer time period for inserting a length of liner within a host pipe. Once the internal liner recovers within the surrounding host pipe it has undergone only minimal or no elongation as compared to the typical 8 to 10% elongation resulting from pulling a liner without supercooling. As has been pointed out in some cases, an actual shrinkage of the liner may occur during the method of the invention, as opposed to elongation.

While the invention has been shown in only one of its forms, it is not thus limited but is susceptible to various changes and modifications without departing from the spirit thereof.

I claim:

1. A method of lining a host pipe with an elastomeric liner having an outside diameter which is initially greater than the inside diameter of the host pipe, the method being a continuous process comprising the steps of:

reducing a length of the liner to a downsized, generally cylindrical outside diameter at a downsizing station;

passing the downsized liner through a cooling station including a thermostatically controlled cooling chamber maintained at a supercooled temperature to thereby cryogenically cool the liner to a supercooled state, the step of supercooling the liner being effective to maintain the outside diameter of the liner in the downsized state and allow the liner to be inserted within the inside diameter of the host pipe;

inserting the downsized liner into the host pipe to be lined;

allowing the liner to expand with time to substantially its original outside diameter to thereby secure the liner within the host pipe.

2. A method of lining an underground pipe with an elastomeric liner having a leading end and a trailing end and having an outside diameter which is initially greater than the inside diameter of the host pipe, the method being a continuous process comprising the steps of:

reducing a length of the liner to a downsized, generally cylindrical outside diameter at a downsizing station;

passing the downsized liner through a cooling station including a thermostatically controlled cooling chamber in which supercooled media are present to thereby cryogenically cool the liner to a supercooled state, the step of supercooling the liner being effective to maintain the outside diameter of the liner in the downsized state and allow the liner to be inserted within the inside diameter of the host pipe;

inserting the downsized liner into the host pipe to be lined by pulling the leading end of the liner within the host pipe;

allowing the liner to expand at atmospheric conditions to substantially its original outside diameter and make total diametric contact with the inside diameter of the host pipe along the entire length of the inserted liner to thereby secure the liner within the host pipe.

* * * * *